United States Patent
Tucker et al.

(10) Patent No.: US 11,616,416 B2
(45) Date of Patent: Mar. 28, 2023

(54) ELECTRIC LINEAR ACTUATOR WITH OPTIMIZED COUPLING

(71) Applicant: Nidec Motor Corporation, St. Louis, MO (US)

(72) Inventors: John M. Tucker, St. Louis, MO (US); Robert Teal Back, Hazelwood, MO (US); Kristine Huynh, St. Charles, MO (US); Barry M. Newberg, Florissant, MO (US)

(73) Assignee: Nidec Motor Corporation, St. Louis, MO (US)

( * ) Notice: Subject to any disclaimer, the term of this patent is extended or adjusted under 35 U.S.C. 154(b) by 44 days.

(21) Appl. No.: 17/308,208

(22) Filed: May 5, 2021

(65) Prior Publication Data

US 2022/0360137 A1    Nov. 10, 2022

(51) Int. Cl.
*H02K 7/06* (2006.01)
*F16H 25/20* (2006.01)

(52) U.S. Cl.
CPC .............. *H02K 7/06* (2013.01); *F16H 25/20* (2013.01); *F16H 2025/2075* (2013.01)

(58) Field of Classification Search
CPC .... F16H 25/20; F16H 2025/2075; H02K 7/06
See application file for complete search history.

(56) References Cited

U.S. PATENT DOCUMENTS

| | | | |
|---|---|---|---|
| 2020/0103009 A1* | 4/2020 | Borgarelli | F16H 25/205 |
| 2020/0186005 A1* | 6/2020 | Borgarelli | B64C 13/505 |
| 2020/0300343 A1* | 9/2020 | Bekircan | F16H 25/2228 |
| 2020/0340564 A1* | 10/2020 | Lück | B60T 13/746 |
| 2020/0378482 A1* | 12/2020 | Blesener | H02K 7/116 |
| 2020/0378483 A1* | 12/2020 | Lin | F16H 25/20 |
| 2020/0400517 A1* | 12/2020 | Benoit | H02K 5/1732 |
| 2021/0079938 A1* | 3/2021 | Yasui | F15B 13/0444 |
| 2021/0095746 A1* | 4/2021 | Ikeda | H02K 7/116 |

\* cited by examiner

*Primary Examiner* — David M Fenstermacher
(74) *Attorney, Agent, or Firm* — Hovey Williams LLP

(57) ABSTRACT

A linear actuator includes a motor, a screw mechanism, and a bearing. The motor includes a stator and a rotor rotatable relative to the stator. The rotor includes a rotor shaft element. The screw mechanism includes a screw element and a follower drivingly engaged with the screw element, with rotation of the screw element causing the follower to shift axially along the screw element. The elements are drivingly intercoupled. The bearing rotatably supports a first one of the elements. The first one of the elements provides support to a second one of the elements such that the bearing also rotatably supports the second one of the elements.

20 Claims, 10 Drawing Sheets

ELECTRIC LINEAR ACTUATOR WITH OPTIMIZED COUPLING

BACKGROUND

1. Field

The present invention relates generally to a linear actuator having an electric motor and a screw mechanism. Embodiments of the present invention concern a linear actuator having an electric motor and a screw mechanism.

2. Discussion of Prior Art

Prior art linear actuators are known to include an electric servo motor and a ball screw device to convert motor shaft rotation to linear movement. In conventional embodiments, known linear actuators have a motor with a motor output shaft and a ball screw device with an input shaft that is drivingly connected to the motor output shaft. In some known embodiments, the motor output shaft and the input shaft of the ball screw device are axially offset and connected by a transmission so that the motor and ball screw device are in a parallel configuration. In other known embodiments, the motor output shaft and the input shaft of the ball screw device are connected end-to-end in a coaxial arrangement.

However, conventional linear actuators are deficient for several reasons. For example, prior art linear actuators having the parallel configuration take up an excessive amount of space in a direction transverse to the parallel axes of the motor output shaft and input shaft. Known linear actuators having the coaxial configuration present an overall axial dimension, measured along a common axis of the motor output shaft and input shaft, that is excessively long. Conventional linear actuators are also known to incorporate a relatively large number of rotating parts, such as drive transmission elements and bearings, that are prone to extensive wear and/or premature failure.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a linear actuator that does not suffer from the problems and limitations of the prior art devices, including those set forth above.

One aspect of the present invention concerns a linear actuator that broadly includes a motor, a screw mechanism, and a first bearing. The motor includes a stator and a rotor rotatable relative to the stator. The rotor includes a rotor shaft element. The screw mechanism includes a screw element and a follower drivingly engaged with the screw element, with rotation of the screw element causing the follower to shift axially along the screw element. The elements are drivingly intercoupled. The first bearing rotatably supports a first one of the elements. The first one of the elements provides support to a second one of the elements such that the first bearing also rotatably supports the second one of the elements.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
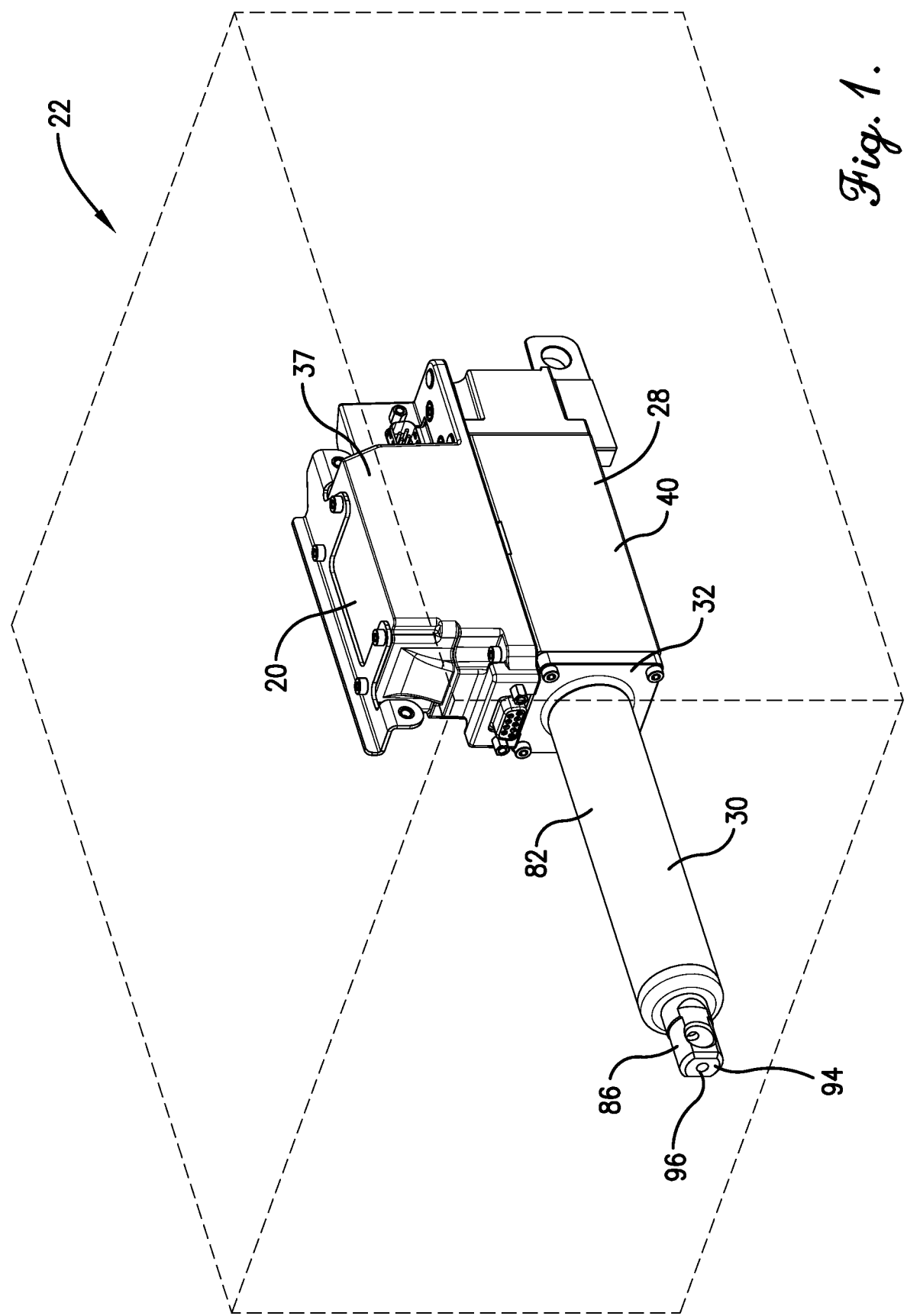
FIG. 1 is a front, left perspective of a linear actuator constructed in accordance with a preferred embodiment of the present invention, schematically illustrating the linear actuator configured as part of an autonomously guided vehicle (AGV)
Figure 2:
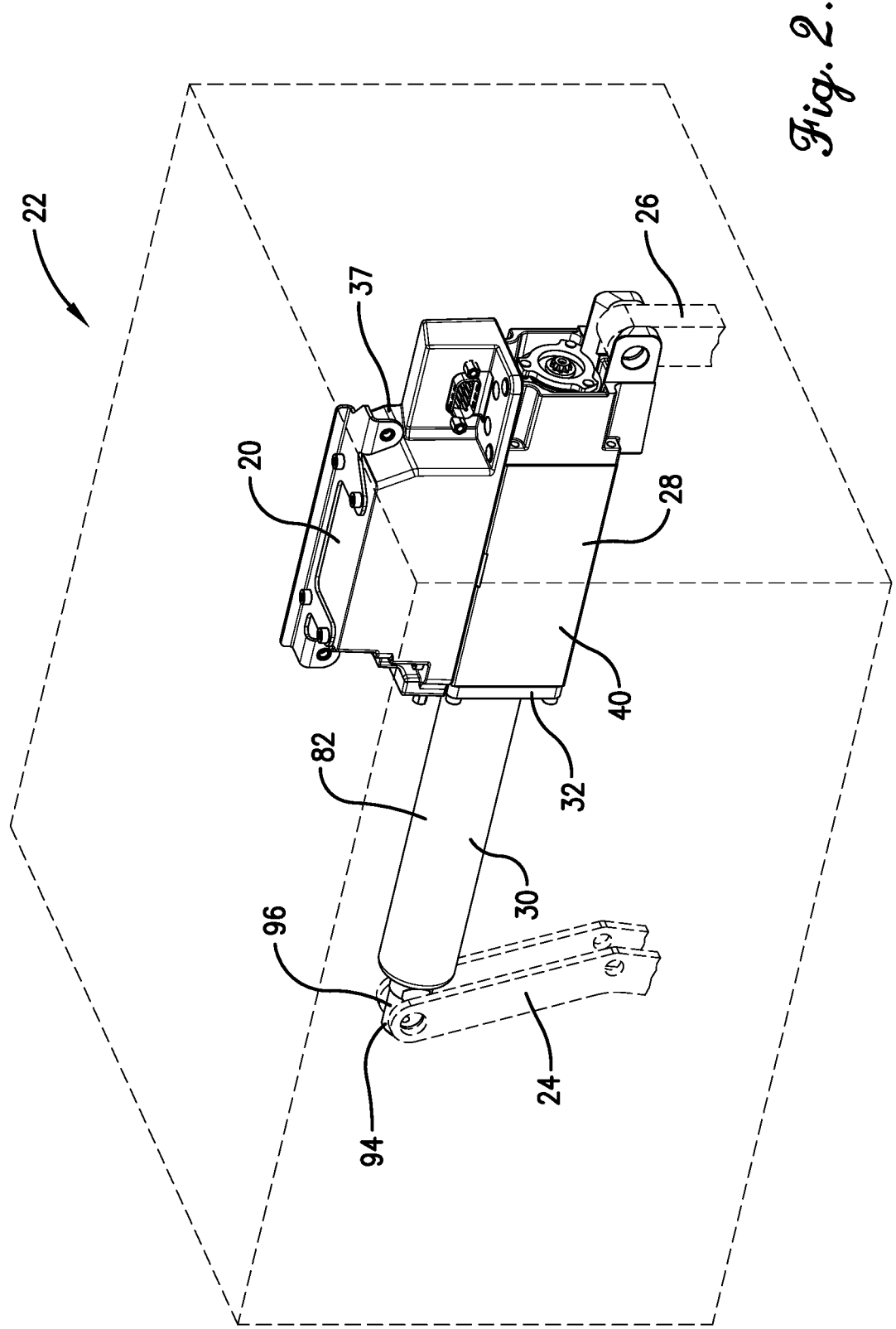
FIG. 2 is a front, right perspective of the linear actuator similar to FIG. 1, but taken from the opposite side to show a brake of the linear actuator, illustrating an output shaft of the actuator in a retracted position and the linear actuator attached to respective vehicle elements of the AGV.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Turning to FIGS. 1-4, a linear actuator 20 is constructed in accordance with a preferred embodiment of the present invention and is configured for use as part of an autonomously guided vehicle (AGV) 22 (shown only schematically in the drawings). Linear actuator 20 is configured to control an operational function of the vehicle 22. Most preferably, linear actuator 20 is operable to shift vehicle elements 24,26 (see FIGS. 2 and 3) for positioning one or more wheels (not shown) of the vehicle 22 (e.g., associated with vehicle advancement). It is also within the ambit of the present invention for other operational functions of the vehicle to be controlled by the linear actuator.

Vehicle 22 is operable to be advanced in a building, such as a warehouse or other commercial structure, for transporting one or more items (not shown), such as a stored inventory item (e.g., for taking items into and out of a storage location). The vehicle 22 preferably includes a chassis (not shown) and rotatable wheels (not shown). In preferred embodiments, vehicle 22 may be configured to lift an item, transport the item from one location to another in the building, deposit the item at its new location, and disengage from the item.

Vehicle 22 is preferably provided with numerous features to enable such operation, including but not limited to one or more printed circuit boards, sensors, cameras, and communication devices. A control system (not shown) is also preferably provided to control each vehicle 22 and to synchronize operation of multiple vehicles 22 in a building. The vehicle 22 is preferably battery-powered and rechargeable. In the illustrated embodiment, linear actuator 20 broadly includes a motor assembly 28, a screw mechanism 30, an interconnecting endshield 32, a bearing 34, and a coupler 36 (see FIG. 4).

Turning to FIGS. 4-6A, motor assembly 28 preferably includes a motor drive 37, motor 38, and motor case 40. As will be explained, the motor assembly 28 and screw mechanism 30 are preferably coaxially arranged with one another. At the same time, the motor drive 37 is axially offset relative to the screw mechanism 30. The depicted arrangement of the motor assembly 28 and screw mechanism 30 provides the linear actuator 20 with a compact form factor. At the same time, the motor assembly 28 and screw mechanism 30 are coaxially arranged and drivingly connected to provide efficient power transmission from the motor assembly 28 to the screw mechanism 30.

The illustrated motor 38 preferably comprises an inner rotor motor and includes a stator 42 and rotor 44. The stator 42 of the depicted embodiment preferably includes a generally toroidal stator core 46 and wiring (not shown) wound about the stator core 46 to form a plurality of coils. The stator core 46 is preferably a laminated stator core comprising a plurality of stacked laminations (not shown), although it is permissible for the stator core to be non-laminated. The stator core 46 preferably comprises a ferromagnetic material such as steel, although use of any one or more electrically conductive materials is permissible without departing from the scope of the present invention.

The stator core 46 also preferably defines an axis of the stator 42. Most preferably, the stator axis is co-axial with an axis A1 (see FIG. 6) of the rotor 44, although offset or skewed axes are permissible according to some aspects of the present invention.

Again, the motor 38 is preferably an inner rotor motor, with the stator 42 at least substantially circumscribing the rotor 44 and presenting an inner circumferential stator core face that faces the rotor 44. A circumferentially extending radial gap is preferably formed between the inner circumferential stator core face and the rotor 44. Use of an outer rotor motor or a dual rotor is permissible according to some aspects of the present invention, however.

Referring to FIGS. 4-6A, and 8, the rotor 44 preferably includes a rotor core 50, a plurality of arcuately arranged magnets 52, and a rotor shaft 54 that extends along and is rotatable about the rotor axis A1. In the depicted embodiment, magnets 52 cooperatively present an outer circumferential rotor face. The radial gap is preferably formed between the inner circumferential stator core face and the outer circumferential rotor face.

Rotor shaft 54 of the illustrated embodiment comprises a spindle with opposite spindle sections 56,58 and presents respective shaft ends 60,62. The shaft ends 60,62 are profiled for complemental, driving engagement with the coupler 36 and a brake 64, respectively. In particular, shaft ends 60,62 present a shaft profile that is complementally shaped to engage the respective profiled bores of the coupler and brake. In the illustrated embodiment, the shaft ends 60,62 have an external splined profile for splined coupling engagement with interior splines of the coupler 36 and brake 64, respectively. More preferably, the external splined profile of the illustrated rotor shaft is formed according to a DIN 5480 Series specification and, more preferably, is a DIN 5480 W8x.75x30x9x8h splined profile. The splined coupling between the coupler 36 and rotor shaft 54 provides various advantages, as described below.

It is also within the ambit of the present invention for one or both shaft ends of the rotor shaft to include an alternative shaft profile for driving engagement. For instance, one or both shaft ends may have an alternative splined profile. In alternative embodiments, at least one shaft end may have a profile with an alternative, non-circular geometric shape, such as a polygonal shape (e.g., a profile shape that is triangular, square, pentagonal, hexagonal, 8-sided, 12-sided, etc.). In other alternative embodiments, one or both shaft ends may present a keyseat for keyed engagement with the corresponding coupler and/or brake. For some aspects of the present invention, an alternative shaft end may have a circular profile that is otherwise fastened to the corresponding coupler or brake, either removably (e.g., via a pinned joint) or non-removably (e.g., where the shaft end and the corresponding bore are adhered, bonded, welded, or frictionally secured by an interference fit).

The illustrated rotor 44 preferably provides a male coupling element in the form of spindle section 56 for removable intercoupled engagement with the screw mechanism 30 via a female coupling element of the coupler 36 to provide a male/female connection (as will be discussed). However, other preferred rotor embodiments may include a rotor with a female coupling element for removable driving attachment relative to the screw mechanism (e.g., via a male coupling element of an alternative coupler).

As used herein, the term "intercoupled" refers to a coupling of elements, and includes, but is not limited to, embodiments where the elements are drivingly connected via at least one coupler element and embodiments where the elements are connected directly to one another.

The motor case 40 preferably defines a motor chamber 66 that at least partly receives the rotor 44 and the stator 42. In a preferred embodiment, the motor case 40 includes a shell 68 and an endshield 70 (see FIGS. 4-6). The shell 68 preferably extends between and interconnects the endshields 32,70. It is preferred that the shell 68 at least substantially circumscribes the stator 42 and in part defines the motor chamber 66, such that the motor chamber 66 at least partly receives the stator 42 and the rotor 44.

Furthermore, the endshield 70 preferably supports the rotor 44. More particularly, the motor 28 includes a rotor shaft bearing 72 that rotatably supports the rotor shaft 54 and, in turn, the rotor 44 in a broad sense. Rotor shaft bearing 72 preferably comprises a ball bearing with inner and outer races 73a,b and a single row of bearing balls 74 (see FIG. 6). Although the illustrated bearing configuration is preferred, alternative linear actuator embodiments may use an alternative rotor shaft bearing to support the rotor (e.g., an alternative ball bearing, roller bearing, plain bearing, etc.).

Endshield 70 preferably defines a rotor shaft bearing hub 76 (see FIG. 6) that at least in part receives the rotor shaft bearing 72. The illustrated rotor shaft bearing 72 is located adjacent the shaft end 62, between the brake 64 and a shaft encoder 78 to provide rotatable support for the rotor shaft 54.

In other preferred embodiments, the rotor shaft bearing may be alternatively positioned at another location, such as an alternative location between the rotor core 50 and the shaft end 62. For instance, the endshield may be alternatively configured so that the rotor shaft bearing is mounted on another endshield surface (e.g., a surface on the opposite side of the endshield). For some aspects of the present invention, the rotor shaft bearing may be mounted on a structure other than the endshield. For instance, the shell (and/or another part of the motor case) may be configured for directly receiving and supporting the rotor shaft bearing.

As will be discussed further, the motor case 40 is configured to be removably attached to the endshield 32. When attached to the shell 68, endshield 32 encloses the motor chamber 66 while also supporting the bearing 34, which indirectly rotatably supports the rotor shaft 54.

Linear actuator 20 preferably includes the brake 64 and shaft encoder 78. Brake 64 comprises an electromagnetic brake and is operably coupled to the rotor shaft 54 to selectively restrict shaft rotation (for instance, to reduce shaft rotational speed and/or to stop shaft rotation entirely). In the depicted embodiment, brake 64 is drivingly engaged with the shaft end 62 of the rotor shaft 54 (see FIG. 6). Motor drive 37 is operably coupled to the brake 64 and is configured selectively engage the brake 64 to restrict rotation of the rotor shaft 54. In alternative embodiments, the brake may be alternatively configured and/or alternatively drivingly attached relative to the rotor shaft for restricting shaft rotation.

In the usual manner, shaft encoder 78 cooperates with the motor drive 37, brake 64, and motor 38 to provide a servo motor. The encoder 78 is configured to sense rotational movement of the rotor 44 and preferably comprises a magnetic encoder with a magnet 80 mounted on the rotor shaft 54 and adhered thereto (see FIG. 6). However, it is also consistent with the principles of the present invention for the motor assembly to have an alternative encoder configuration, such as an optical encoder. For some aspects of the present invention, alternative embodiments of the motor assembly may be devoid of an encoder.

Turning to FIGS. 4-7, the screw mechanism 30 is operable to convert rotation of the rotor shaft 54 to axial linear motion. The screw mechanism 30 is preferably positioned so that the motor assembly 28 and screw mechanism 30 are coaxially arranged with one another. The screw mechanism 30 includes a screw mechanism housing 82, screw 84, follower 86, follower bushing 88, and end bushing 90. In the illustrated embodiment, the follower 86 includes a ball nut 92 and an output shaft 94. The output shaft 94 presents a distal follower end 96 (see FIG. 7) operable to be drivingly attached to the element 24. As used herein, the terms "proximal" and "distal" generally describe locations relative to the rotor 44 along the axis A1.

Screw mechanism housing 82 operably receives the screw 84, ball nut 92, and output shaft 94. Housing 82 comprises a cylindrical shell that is removably attached relative to the motor case 40. The illustrated housing 82 presents opposite housing ends 98,100 and an interior shell surface 102. Shell surface 102 partly defines a screw chamber 104 (see FIG. 7). The housing 82 permits the output shaft 94 to slide into and out of the chamber 104.

Figure 3:
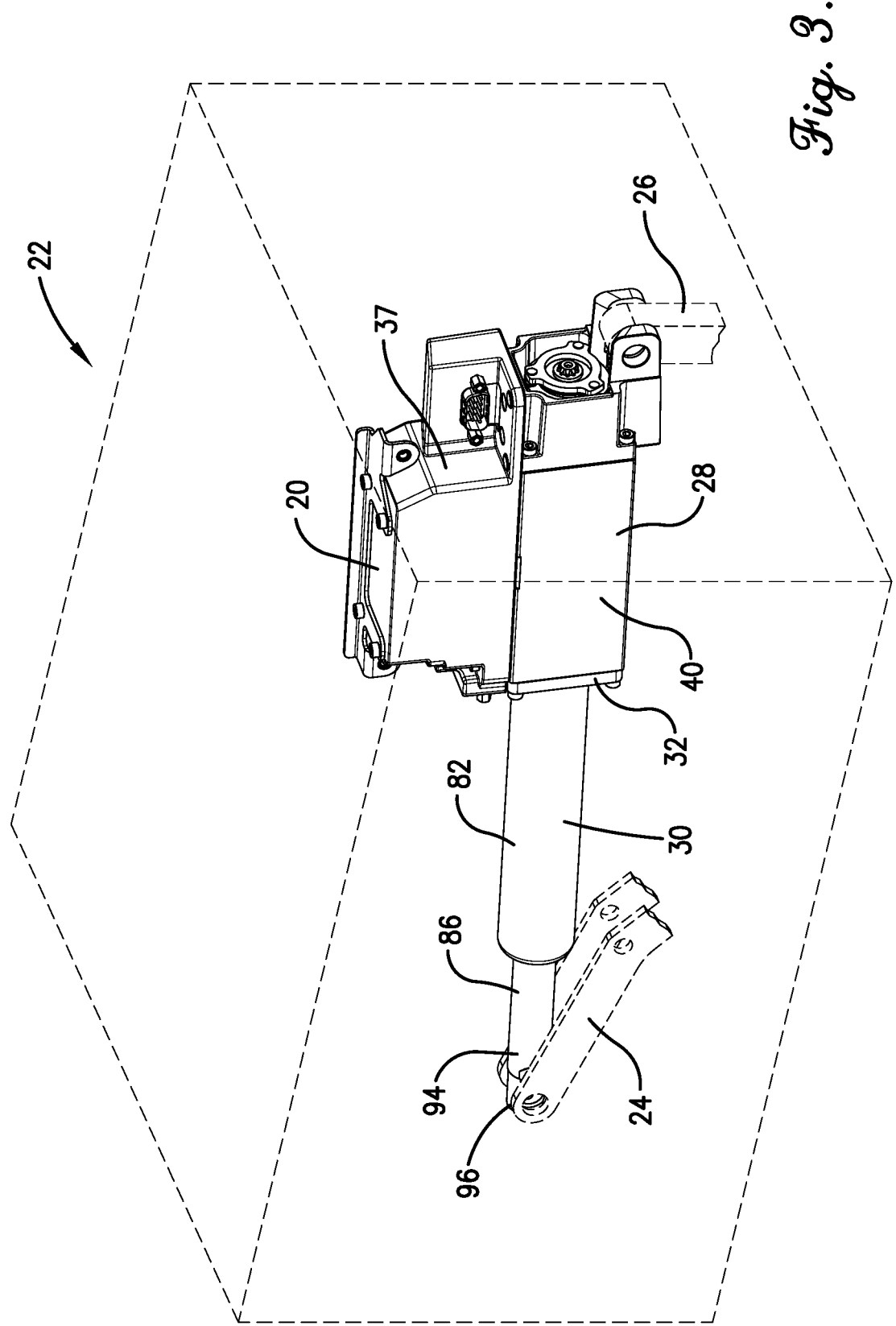
FIG. 3 is a front, right perspective of the linear actuator similar to FIG. 2, but showing the output shaft of the actuator in an extended position to shift the vehicle elements relative to each other.
Figure 4:
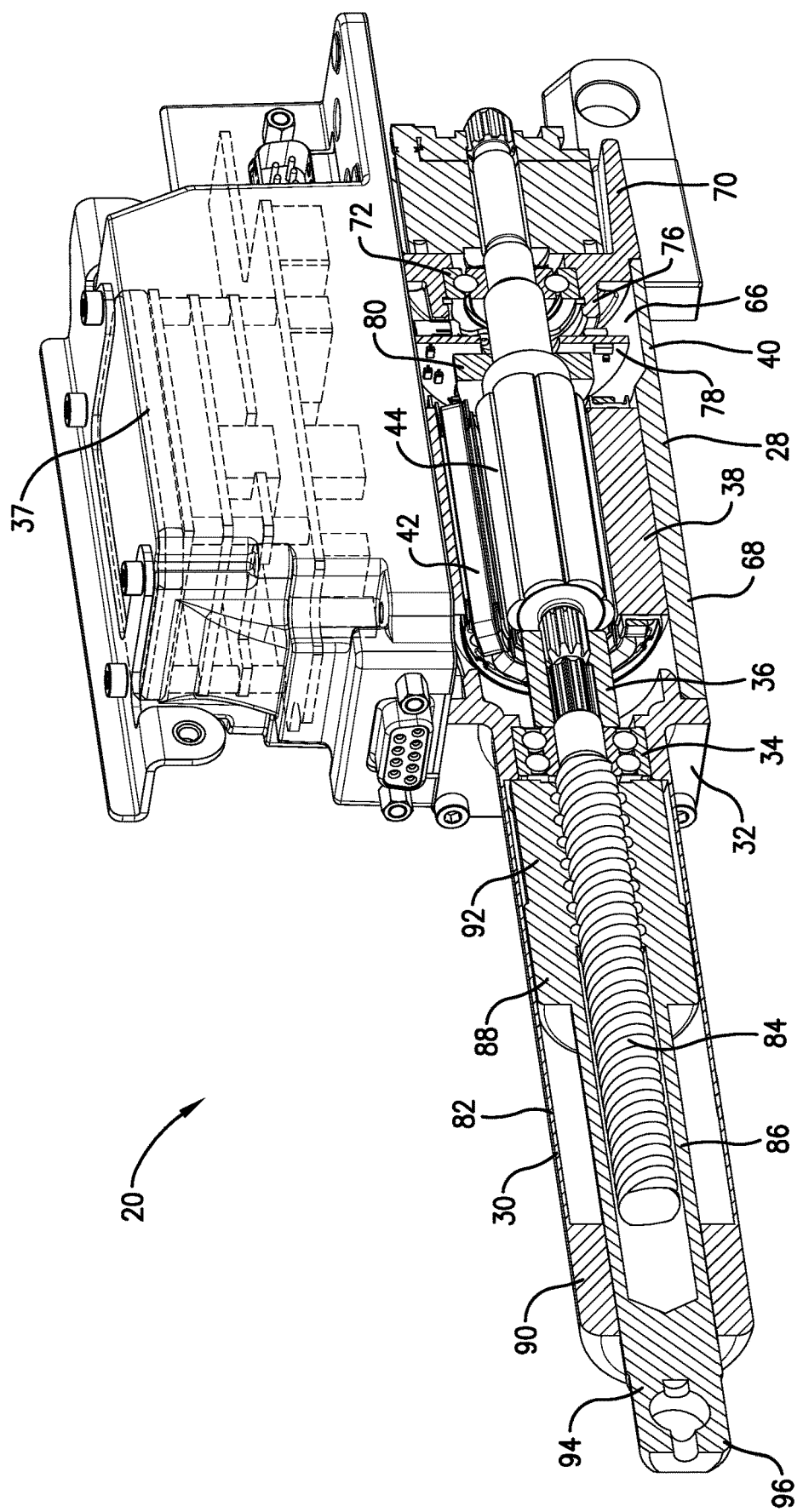
FIG. 4 is a fragmentary perspective of the linear actuator depicted in FIGS. 1-3, particularly showing the motor assembly, screw mechanism, brake, endshield, coupler, and bearings.
Figure 6:
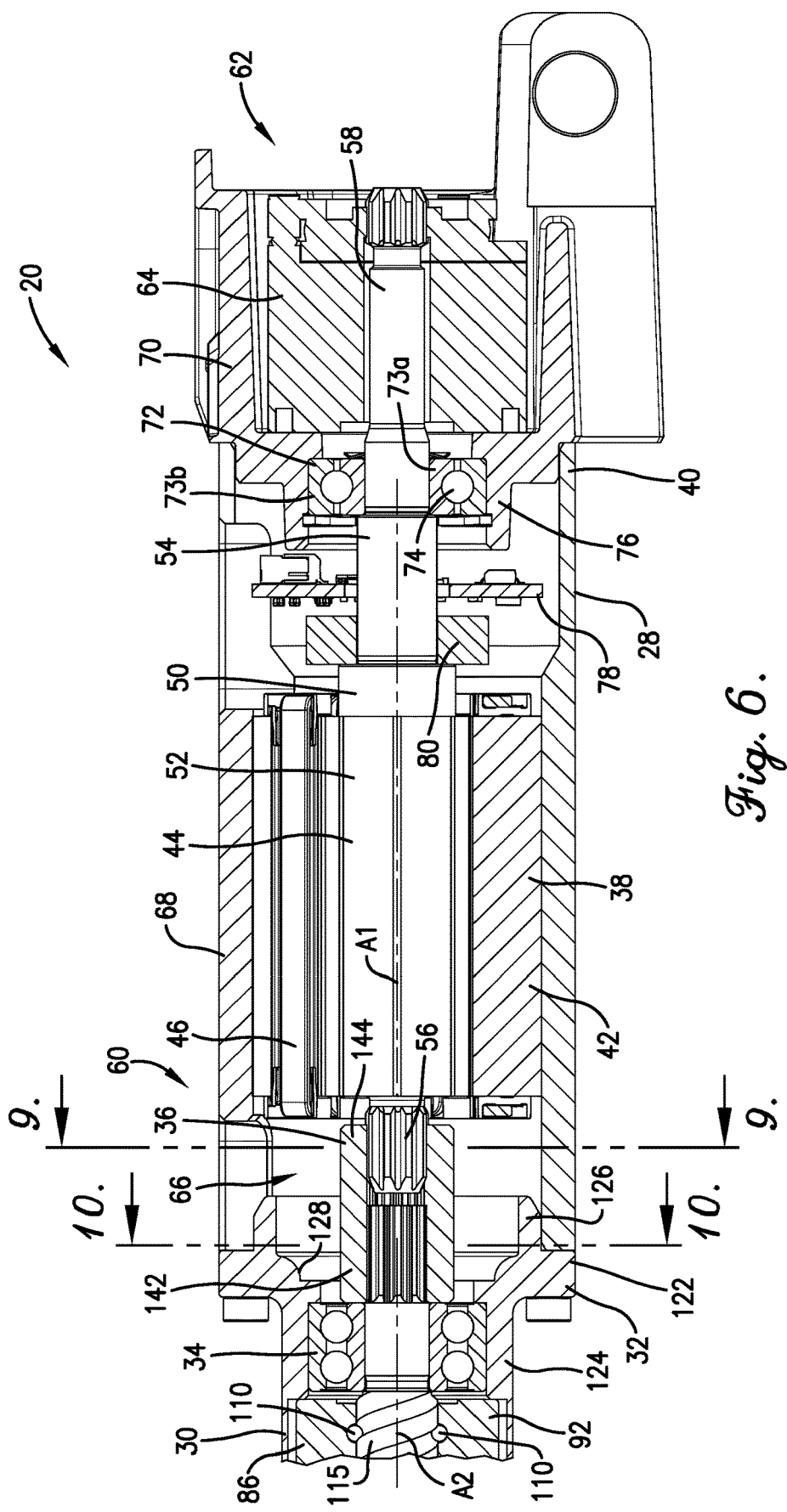
FIG. 6 is an enlarged fragmentary cross section of the linear actuator shown in FIGS. 1-5, showing the motor assembly operably attached to the brake and a linear encoder, and further showing attachment of the motor assembly to the screw mechanism.
Figure 7:
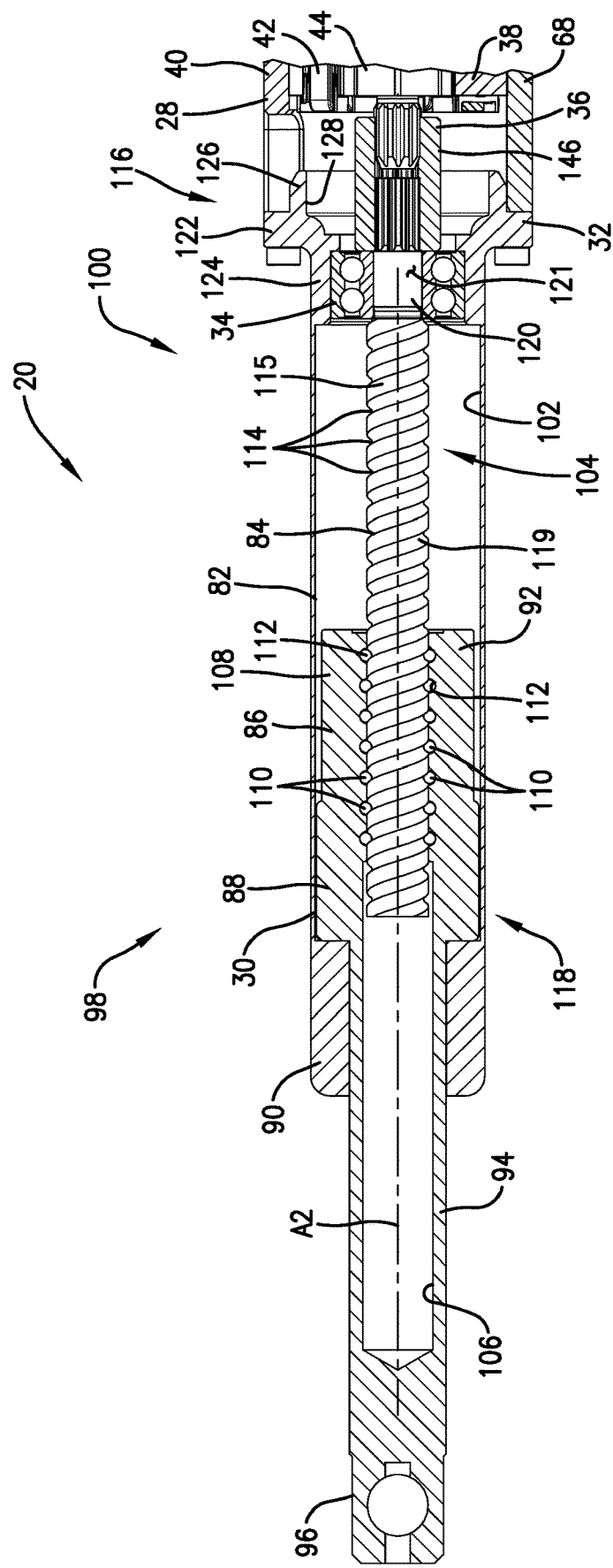
FIG. 7 is an enlarged fragmentary cross section of the linear actuator shown in FIGS. 1-6A, showing the output shaft in the extended position.
Figure 8:
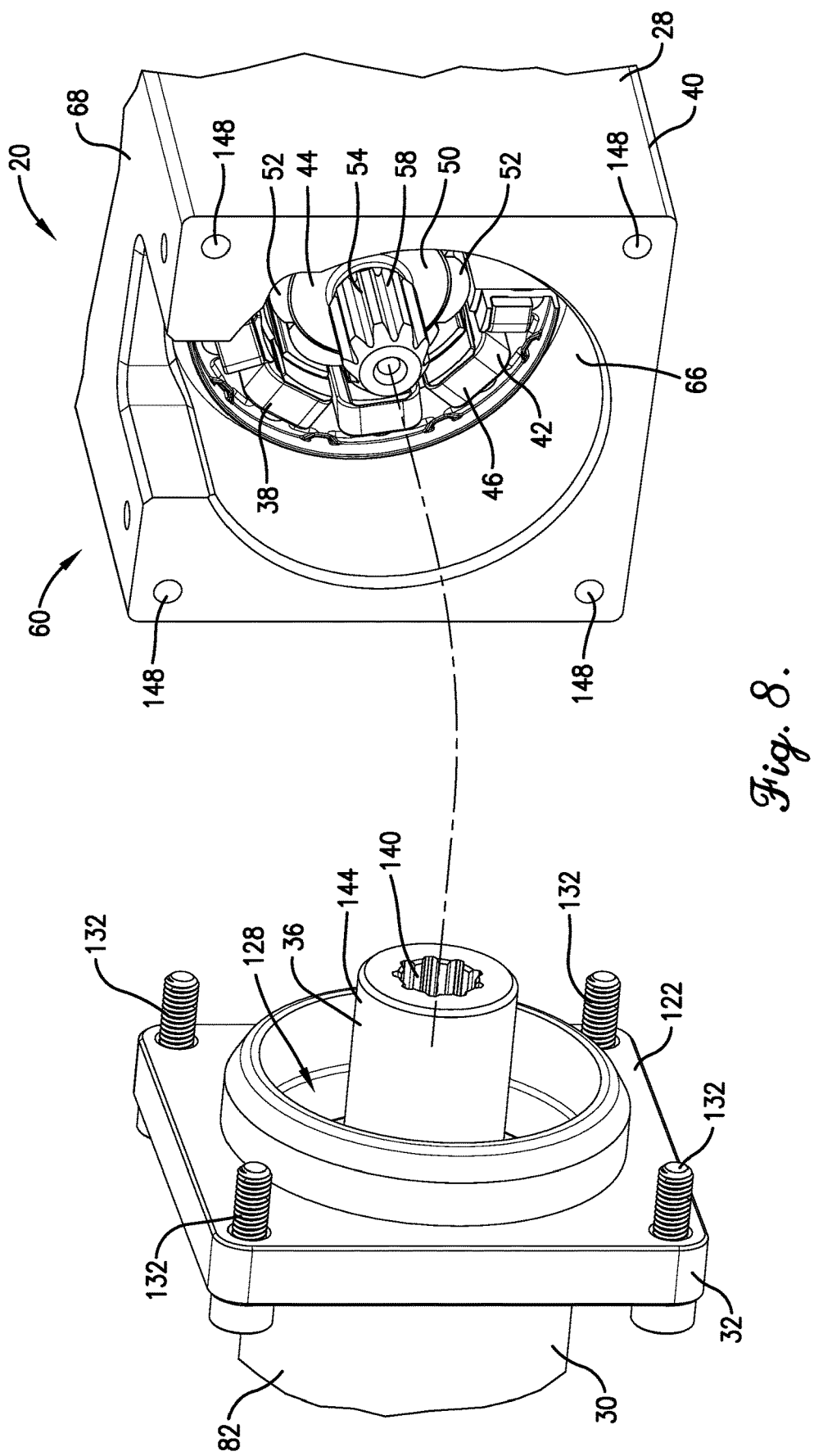
FIG. 8 is a fragmentary exploded perspective of the linear actuator shown in FIGS. 1-7, showing the motor assembly detached from the endshield and the coupler.

In the usual manner, the follower 86 is drivingly engaged with the screw 84, such that axial rotation of the screw 84 causes the follower 86 to shift axially along the screw 84 between a retracted position (see FIGS. 2, 4, and 5) and an extended position (see FIGS. 3 and 7). As will be explained, the screw 84 and rotor shaft 54 comprise rotating elements that are drivingly intercoupled with one another. As the screw 84 rotates, the ball nut 92 and output shaft 94 are configured to be axially driven by the screw 84 along a screw axis A2 (see FIGS. 6-7) to shift the follower end 96 and the driven element 24 axially.

Screw 84 is rotatably supported by the bearing 34 and the follower 86, and the follower 86 is supported within the screw mechanism housing 82 by the follower bushing 88 and the end bushing 90. In other words, the follower bushing 88 and the end bushing 90 each provide a bearing for rotatable support of the screw 84. However, in alternative embodiments, the screw mechanism may include another bearing arrangement to support the screw. For instance, alternative embodiments of the screw may be directly supported by a second bearing.

Figure 5:
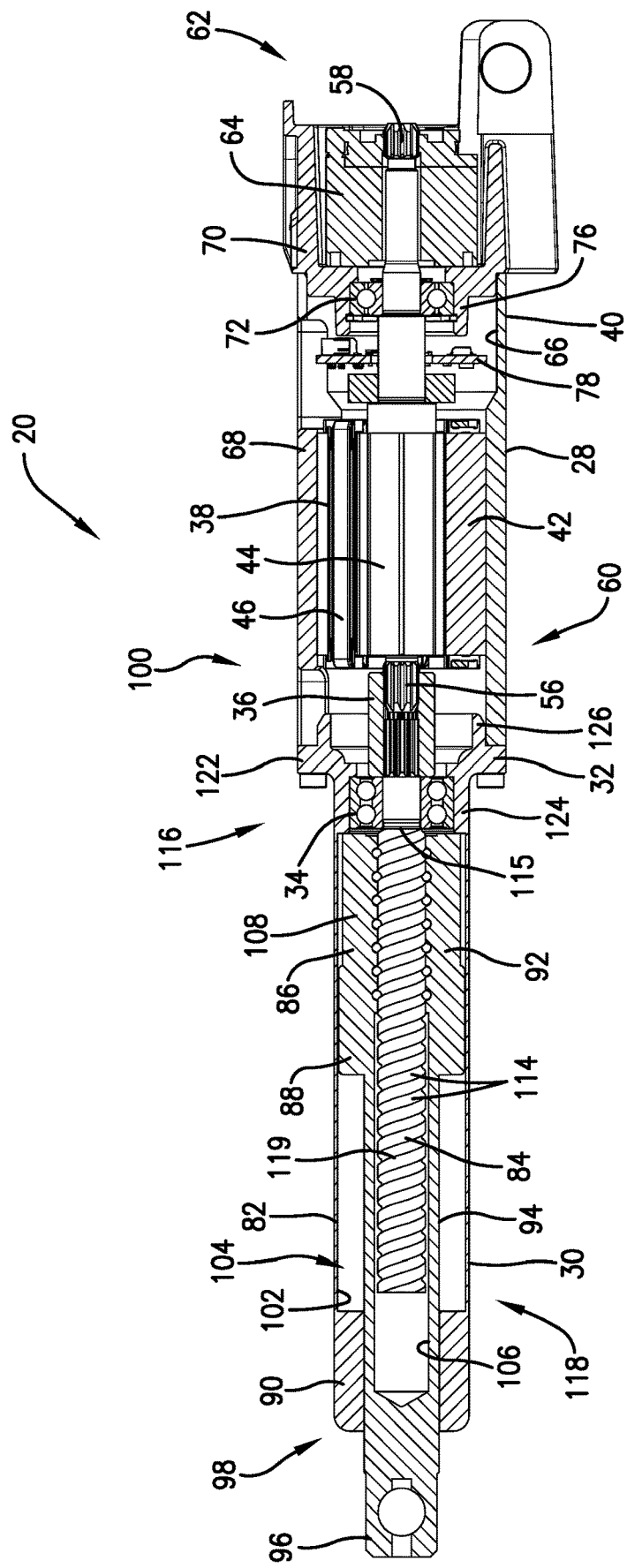
FIG. 5 is a fragmentary cross section of the linear actuator shown in FIGS. 1-4, showing the output shaft of the actuator in the retracted position.

The ball nut 92 and output shaft 94 of the illustrated screw mechanism 30 are attached to one another and cooperatively present a bore 106 to slidably receive the screw 84 (see FIGS. 5 and 7). In the depicted embodiment, the screw 84 and output shaft 94 are generally coaxial with one another. However, embodiments of the follower may be alternatively configured and/or positioned relative to the screw. For instance, an alternative output shaft may be drivingly attached to the ball nut while being axially offset from the screw.

Ball nut 92 and output shaft 94 are slidably supported for axial movement relative to the housing 82. More particularly, the screw mechanism 30 includes the follower bushing 88 and end bushing 90. Bushings 88 and 90 cooperatively support the output shaft 94 and ball nut 92 for axial movement between the retracted position (see FIGS. 2, 4, and 5) and the extended position (see FIGS. 3 and 7).

The follower bushing 88 is preferably attached relative to the follower 86 to move therewith. Follower bushing 88 slidably engages the interior shell surface 102 to support and position the follower 86 during axial movement thereof. End bushing 90 is preferably attached to and encloses the housing end 98 of the housing 82. Again, it is within the scope of the present invention for the screw mechanism 30 to have an alternatively supported output shaft.

The screw mechanism 30 is preferably provided in the form of a ball screw, with the follower 86 including the ball nut 92. Ball nut 92 includes a body 108 and a plurality of bearing balls 110 (see FIGS. 6A and 7). The body 108 presents helical grooves 112 that cooperate with helical grooves 114 of the screw 84 to form a continuous channel that receives the bearing balls 110 (see FIGS. 6A and 7). In the usual manner, it will be understood that bearing balls 110 are arranged in series and spaced uniformly along the length of the grooves 112,114 (to clearly depict the screw 84 within the ball nut 92, some bearing balls are not shown in the figures). While not shown, embodiments of the ball nut may include a return channel for circulating bearing balls from one end of the ball nut to the other end.

The use of a ball screw is preferred for converting rotation of the rotor shaft 54 to axial linear motion of the output shaft 94 of the screw mechanism 30. It will be appreciated that the ball screw provides relatively low-friction operation while minimizing backlash within the screw mechanism. However, embodiments of the linear actuator may include a screw mechanism other than a ball screw. For instance, alternative embodiments of the screw mechanism may comprise a lead screw having a follower that is devoid of bearing balls.

The illustrated screw 84 comprises a unitary spindle 115 that presents opposite proximal and distal shaft ends 116,118 (see FIG. 7). Screw 84 includes a grooved section 119 that presents helical grooves 114 extending to the distal shaft end 118 (see FIGS. 5 and 7). Screw 84 also includes a spindle section 120 with a bearing support surface 121 adjacent the proximal shaft end 116. The bearing 32 is received on the support surface 121 and is configured to carry an axial force applied to the screw 84 by the follower 86, as will be described.

The proximal shaft end 116 of screw 84 is preferably profiled for complemental, driving engagement with the coupler 36. Preferably, the shaft end 116 of the screw 84 presents a shaft profile that is complementally shaped to engage the profiled bore of the coupler 36. In the illustrated embodiment, the shaft end 116 has an external splined profile for splined coupling engagement with the interior splines of the coupler 36. More preferably, the external splined profile of the illustrated screw 84 is formed according to a DIN 5480 Series specification, although an alternative spline specification may be utilized. As will be described, the splined coupling provides various advantages.

It is also within the ambit of the present invention for the proximal shaft end of the screw to include an alternative shaft profile for driving engagement. For instance, shaft end may have an alternative splined profile. In alternative embodiments, the proximal shaft end of the screw may have a profile with an alternative, non-circular geometric shape, such as a polygonal shape (e.g., a profile shape that is triangular, square, pentagonal, hexagonal, 8-sided, 12-sided, etc.). In other alternative embodiments, the proximal shaft end may present a keyseat for keyed engagement with the coupler. For some aspects of the present invention, an alternative proximal shaft end may have a circular profile that is otherwise fastened to the coupler, either removably (e.g., via a pinned joint) or non-removably (e.g., where the shaft end and the corresponding bore are adhered, bonded, welded, or frictionally secured by an interference fit).

In preferred embodiments, screw 84 preferably provides a male coupling element in the form of spindle section 120 for removable intercoupled engagement with the rotor 44 via a female coupling element of the coupler 36 to provide a male/female connection (as will be discussed). However, other preferred embodiments of the screw mechanism may include a female coupling element for removable driving attachment to the rotor (e.g., via a male coupling element of an alternative coupler).

Turning to FIGS. 5-8, the endshield 32 is configured to support the screw 84 and the rotor shaft 54. At the same time, the depicted endshield 32 serves to removably interconnect the screw mechanism housing 82 and the motor case 40 of the motor assembly 28. Endshield 32 includes a flange 122 and annular mounting rims 124,126 (see FIG. 6A). Endshield 32 also presents an opening 128 that extends continuously through the flange 122 and mounting rims 124,126 (see FIGS. 6-8).

The mounting rim 124 is preferably fixed to the housing 82 of the screw mechanism 30. Mounting rim 124 also comprises a bearing hub that presents a bearing surface 130 to receive the bearing 34 (see FIG. 6A).

When endshield 32 is attached to the shell 68, the mounting rim 126 is inserted through one end of the shell 68, and the flange 122 is located in engagement with the end of the shell 68. The attached endshield 32 preferably encloses the motor chamber 66 while also supporting the bearing 34. In the illustrated embodiment, endshield 32 is removably attached to motor case 40 by threaded fasteners 132, which extend through openings in the flange 122 (see FIGS. 6A and 8) and are threaded into the shell 68.

Preferably, removable connection of the endshield 32 and motor case 40 with fasteners 132 enables the motor assembly 28 and screw mechanism 30 to be removably attached relative to each other. However, for some aspects of the present invention, an alternative actuator may have one or more elements of the motor assembly fixed relative to one or more elements of the screw mechanism, so that such components are nonremovable (for instance, where the fixed components are only separable from each other by damaging one or more of the components).

Although the configuration of endshield 32 is preferred, certain aspects of the present invention may include an alternative interconnecting endshield (e.g., for providing an alternative connection between the motor case and the screw mechanism housing and/or alternatively supporting the bearing). It is within the ambit of some aspects of the present invention for the linear actuator to be devoid of an interconnecting endshield (e.g., where the motor case and screw mechanism housing are directly attached to each other).

In the depicted embodiment, the bearing 32 is mounted on the endshield and rotatably supports the screw 84. Bearing 32 preferably comprises a ball bearing with inner and outer races 134a,b and two (2) rows of bearing balls 136 (see FIG. 6A). By including two (2) rows of bearing balls 136, the bearing 32 is configured to support an axial thrust load applied by the screw 84 and directed along the screw axis A2. Although the illustrated bearing configuration is preferred, other linear actuator embodiments may use, alternatively or additionally, an alternative bearing (or thrust bearing) to support the screw, such as a roller bearing (e.g., an angled roller bearing).

Figure 6A:
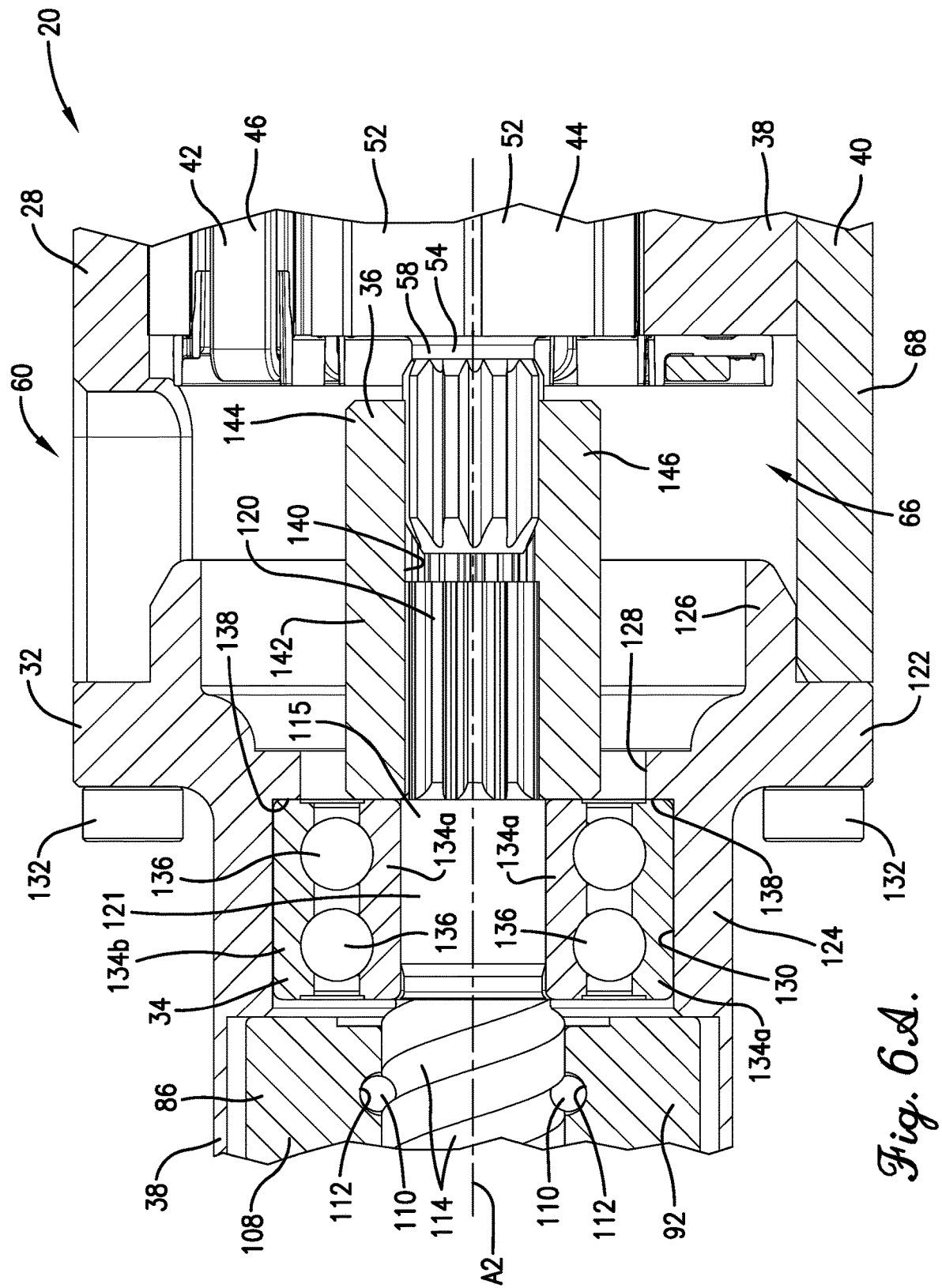
FIG. 6a is a greatly enlarged, fragmentary cross section of the linear actuator similar to FIG. 6, showing a screw of the screw mechanism supported by the bearing, which is mounted on the endshield, and further showing the screw and a rotor of the motor assembly intercoupled by the coupler.

Preferably, bearing 32 is received by the bearing surface 130 associated with rim 124 and is engaged with a shoulder 138 (see FIG. 6A). Bearing 32 is also preferably configured to receive the support section 121 for supporting the screw 84 adjacent the shaft end 116. As will be explained, screw 84 provides support to the rotor shaft 54 so that the bearing 32 also rotatably supports the rotor shaft 54.

The illustrated motor assembly 28 is preferably devoid of a bearing adjacent the screw 84. In particular, the rotor 44 is preferably not directly supported by a bearing at any location distal of the rotor core 50. In this manner, the motor assembly 28 of the depicted embodiment is provided with only a single bearing (the illustrated rotor shaft bearing 72).

It is also within the ambit of the present invention for the bearing 32 to be alternatively positioned to provide rotating support for the rotor shaft 54 and screw 84. For instance, the endshield may be alternatively configured so that the bearing 32 is mounted on another endshield surface (e.g., a surface on the opposite side of the endshield flange).

For some aspects of the present invention, the bearing may be mounted on a structure other than the endshield. For instance, the shell (and/or another part of the motor case) may be configured for directly receiving and supporting the bearing. In alternative embodiments in which the bearing is provided as part of the motor assembly, the supporting relationship between the rotor shaft and screw may be reversed. That is to say, if the bearing is alternatively provided as part of the motor assembly, the bearing may provide direct rotatable support to the rotor shaft, and the rotor shaft may rotatably support the screw. In such an alternative, the screw end proximal the motor assembly may be considered cantilevered but supported indirectly by the bearing.

Turning to FIGS. 6-10, the illustrated coupler 36 serves to drivingly and removably intercouple the screw 84 and rotor shaft 54. Further, the preferred coupler 36 not only transmits torque between the screw 84 and rotor shaft 54, the coupler 36 also preferably transfers the load of the cantilevered end of the rotor shaft 54 to the screw 84. The rotor shaft 54 and screw 84 are preferably drivingly intercoupled in a coaxial arrangement. Consequently, the motor assembly 28 and screw mechanism 30 are coaxially arranged and drivingly connected to one another. As noted above, the motor drive 37 is preferably axially offset relative to the screw mechanism 30.

With the rotor shaft 54 and screw 84 intercoupled, the rotor shaft 54 and screw 84 preferably rotate with one another. Again, rotation of the screw 84 causes the output shaft 90 of the screw mechanism 30 to shift axially along the screw 84. Coupler 36 preferably comprises a unitary tubular sleeve with a profiled coupler bore 140 that drivingly receives and engages the screw 84 and rotor shaft 54 (see FIGS. 6A, 9, and 10). More specifically, the coupler 36 presents opposite female coupler sections 142,144 for driving engagement with the screw 84 and rotor shaft 54, respectively (see FIGS. 6, 9, and 10).

As noted above, bearing 32 rotatably supports the screw 84 relative to the endshield 32. Coupler 36 preferably removably intercouples the rotor shaft 54 and screw 84 to form a detachable joint 146 (see FIG. 7), which permits the bearing 32 to rotatably support the rotor shaft 54. The preferred coupler bore 140 presents a bore profile that is complementally shaped to engage the profiled ends of the screw 84 and rotor shaft 54 (see FIGS. 9 and 10). In the illustrated embodiment, the bore 140 has an internal splined profile that extends continuously from one end of the coupler 36 to the other end of the coupler 36, such that both coupler sections 142,144 have generally the same bore profile. Preferably, the internal splined profile of the illustrated bore is formed according to a DIN 5480 Series specification and, more preferably, is a DIN 5480 N8x.75x30x9x9H splined profile.

It is also within the ambit of the present invention for the coupler 36 to have an alternative bore profile for driving engagement. For instance, one or both coupler sections may have an alternative splined profile. In particular, although the illustrated coupler 36 has a single, continuous bore profile, one or both of the coupler sections may be alternatively configured so that the coupler sections present bore profiles that are different compared to each other.

In alternative embodiments, at least one coupler end may have a bore profile with an alternative, non-circular geometric shape, such as a polygonal shape (e.g., a profile shape that is triangular, square, pentagonal, hexagonal, 8-sided, 12-sided, etc.). In other alternative embodiments, one or both coupler ends may present a keyseat for keyed engagement with the corresponding screw and/or rotor shaft. For some aspects of the present invention, an alternative coupler end may have a circular profile that is otherwise fastened to the corresponding screw or rotor shaft, either removably (e.g., via a pinned joint) or non-removably (e.g., where the shaft end and the corresponding bore are adhered, bonded, welded, or frictionally secured by an interference fit).

Figure 10:
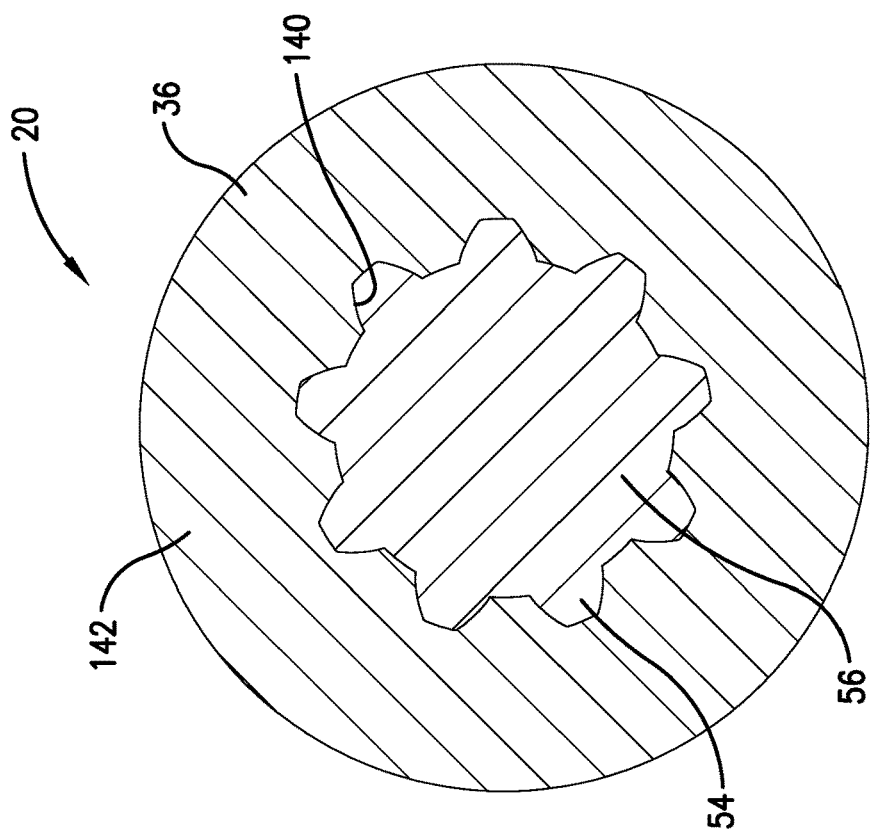
FIG. 10 is a cross section of the linear actuator taken along line 10-10 in FIG. 6, showing a splined end of the screw engaged with the splined bore of the coupler.

The bore 140 of coupler section 142 is preferably configured for complemental splined engagement with the splined shaft end 116 of the screw 84 in an interference fit (see FIGS. 6 and 10). The complemental splined connection between the bore 140 and splined shaft end 116 provides a relatively simple driving connection, while providing high torque transfer, low-backlash, and reliable coaxial alignment between the coupler 36 and screw 84. However, the splined fit between the coupler and splined shaft end of the screw may be alternatively configured for at least some aspects of the present invention. For instance, a slip fit between the coupler and splined end of the screw may be configured to provide a removable coupling between the coupler and screw.

Figure 9:
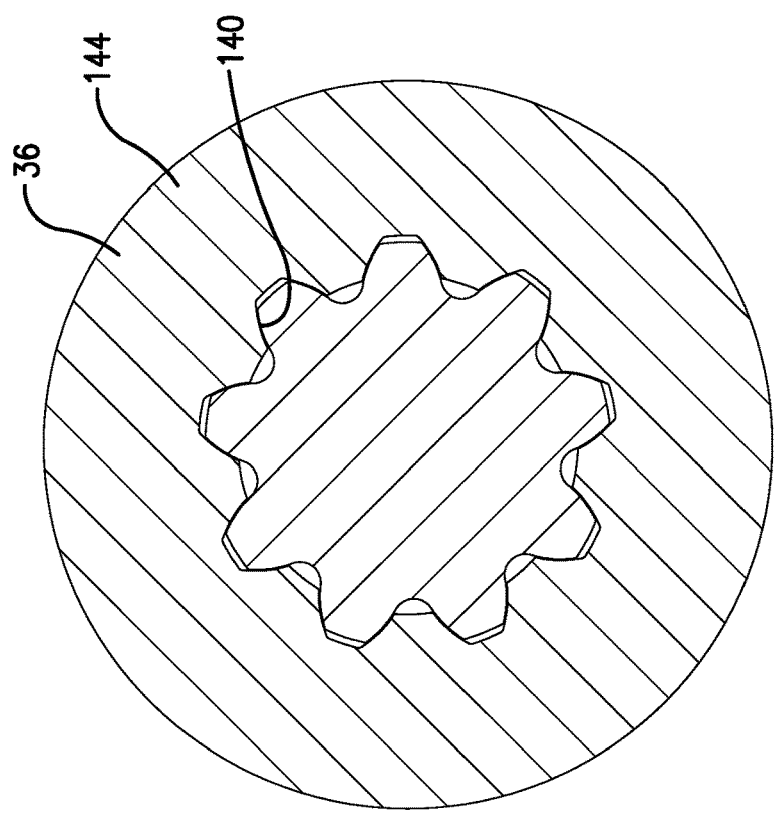
FIG. 9 is a cross section of the linear actuator taken along line 9-9 in FIG. 6, showing a splined end of the rotor shaft engaged with a splined bore of the coupler.

The bore 140 of coupler section 144 is preferably configured to provide a so-called "side fit" spline configuration for complemental engagement with the rotor shaft 54 (see FIGS. 6 and 9). More specifically, the bore profile is complementally shaped relative to the profile of shaft end 60 so that the bore and shaft cooperatively provide a DIN Series 9H/8h precision slip fit. The complemental slip-fit splined connection between the bore 140 and rotor shaft 54 also provides a relatively simple driving connection, while providing high torque transfer, low-backlash, and reliable coaxial alignment between the coupler 36 and rotor shaft 54. The splined fit between the coupler and the rotor shaft may be alternatively configured for at least some aspects of the present invention. For instance, an interference fit between the coupler and splined end of the rotor shaft may be configured to provide a relatively non-removable coupling between the coupler and rotor shaft (e.g., where the coupler and screw have a removable coupler fit).

As noted above, the spindle sections 56 of rotor 44 and the spindle section 120 of screw 84 preferably provide male coupling elements for removable intercoupled engagement. Both coupler sections 142,144 of the coupler 36 preferably comprise female coupling elements configured to receive the male coupling elements of the spindle sections 56,120. Thus, the spindle section 120 and coupler section 142 cooperatively provide a male/female connection between the screw 84 and coupler 36, while the spindle section 56 and coupler section 144 cooperatively provide a male-female connection between the rotor 44 and coupler 36. However, in other preferred embodiments of the coupler, one or both coupler sections may include a male coupling element for removable driving attachment to the rotor and/or screw (e.g., where the rotor and/or screw have a female coupling element).

Linear actuator 20 is preferably assembled by removably attaching the screw mechanism 30 to the motor assembly 28. With the screw mechanism 30 and motor assembly 28 separated from each other (see FIG. 8), the screw mechanism 30 and motor assembly 28 may be oriented so that the splined shaft end 60 of the rotor shaft 54 is located adjacent and partly inserted into the coupler bore 140. As the shaft end 60 is further inserted, the shaft end 60 and the coupler bore 140 are brought into coaxial alignment, and the splines of the shaft end 60 and the coupler bore 140 are engaged with each other. Endshield 32 is shifted adjacent the shell 68 so that the fasteners 132 are moved into alignment with threaded holes 148 of the shell 68 (see FIG. 8). Fasteners 132 may then be removably secured through the flange 122 and into the shell 68.

The screw mechanism 30 and motor assembly 28 may be selectively detached from each other by removing the fasteners 132 from threaded engagement with the shell 68. Removal of the fasteners 132 permits the separation of the screw mechanism 30 and motor assembly 28 by sliding the shaft end 60 out of driving engagement with the coupler 36.

Although the preferred actuator 20 includes a discrete coupler 36 that is separate from the rotor 44 and the screw 84, other preferred embodiments of the actuator may be devoid of a separate coupler component. For instance, alternative coupling embodiments may include a coupler component that is integrally formed with the rotor and/or the screw. In other words, for other preferred embodiments of the actuator, the rotor and/or the screw may include male and female coupling elements, respectively, for direct male/female connection of the rotor and screw to one another.

It is also within the scope of the present invention for a male/female connection between the rotor and screw to be replaced with a hermaphroditic connection (that is, a connection formed by complemental coupling elements each having male and female coupling features). For instance, the rotor-and-coupler connection and/or the screw-and-coupler connection may be provided by hermaphroditic coupling elements. Similarly, the screw and rotor may be directly removably connected to each other by hermaphroditic coupling features.

The illustrated coupler 36 is located within the motor chamber 66, adjacent the rotor core 50. Because the bearing 34 is located on the support section 121, the illustrated coupler 36 is located proximally of the bearing 34, between the bearing 34 and the rotor shaft 54. In other preferred embodiments, it will be appreciated that the coupler may be alternatively located relative to the bearing and/or the rotor. For instance, in embodiments where the bearing directly supports the rotor shaft (such that the bearing is provided as part of the motor assembly), the coupler may be located distally of the bearing.

In use, the motor 38 of the linear actuator 20 is operable to drive the output shaft 94 of the screw mechanism 30 axially between retracted and extended positions. Rotation of the rotor shaft 54 produces corresponding rotation of the screw 84, and rotation of the screw 84 causes the output shaft 90 to shift axially along the screw 84.

The linear actuator 20 may be selectively assembled by removably attaching the screw mechanism 30 to the motor assembly 28. As described above, the screw mechanism 30 and motor assembly 28 may be oriented so that the splined shaft end 60 of the rotor shaft 54 is located adjacent and partly inserted into the coupler bore 140. The shaft end 60 may be further inserted so that the shaft end 60 and the coupler bore 140 are brought into engagement with each other. Fasteners 132 may then be removably secured through the flange 122 and into the shell 68 to attach the endshield 32 to the shell 68. The screw mechanism 30 and motor assembly 28 may be selectively detached from each other by removing the fasteners 132 from threaded engagement with the shell 68.

When assembled, the rotor shaft 54 and screw 84 are preferably drivingly intercoupled in a coaxial arrangement. Furthermore, the motor assembly 28 and screw mechanism 30 are coaxially arranged and drivingly connected to one another. Again, the depicted arrangement of the motor assembly 28 and screw mechanism 30 provides the linear actuator 20 with a compact form factor. Intercoupling of the motor assembly 28 and screw mechanism 30 in the coaxial arrangement also permits power to be transmitted efficiently from the motor assembly 28 to the screw mechanism 30.

As used herein, the phrase "and/or," when used in a list of two or more items, means that any one of the listed items can be employed by itself or any combination of two or more of the listed items can be employed. For example, if an assembly is described as containing components A, B, and/or C, the assembly may contain A alone; B alone; C alone; A and B in combination; A and C in combination; B and C in combination; or A, B, and C in combination.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A linear actuator comprising:
    a motor including a stator and a rotor rotatable relative to the stator,
    said rotor including a rotor shaft element,
    a screw mechanism including a screw element and a follower drivingly engaged with the screw element, with rotation of the screw element causing the follower to shift axially along the screw element,
    said driving engagement between the screw element and follower being spaced from the rotor shaft element,
    said rotor shaft element and said screw element being drivingly intercoupled; and
    a first bearing rotatably supporting a first element of the rotor shaft element and the screw element,
    said first element providing support to a second element of the rotor shaft element and the screw element such that the first bearing also rotatably supports the second element.

2. The linear actuator as claimed in claim 1,
    said second element presenting opposite first and second element ends; and a second bearing adjacent the second element end to provide rotatable support thereto, said first element end being coupled to the first element and thereby supported by the first bearing.

3. The linear actuator as claimed in claim 2, said first element comprising the screw element and said second element comprising the rotor shaft element.

4. The linear actuator as claimed in claim 3, said first bearing being received on the screw element and configured to carry an axial force applied to the screw element.

5. The linear actuator as claimed in claim 2, further comprising:

a coupler drivingly attached to the screw element and the rotor shaft element and configured to transmit torque therebetween, with the coupler being located between the bearings.

6. The linear actuator as claimed in claim 1, further comprising:

a coupler drivingly attached to the screw element and the rotor shaft element and configured to transmit torque therebetween.

7. The linear actuator as claimed in claim 1, said motor including a motor housing that operably receives at least part of the rotor shaft element, said screw mechanism including a screw mechanism housing that operably receives at least part of the screw element; and an endshield interconnecting the housings.

8. The linear actuator as claimed in claim 1, said follower including a ball nut and an output shaft attached relative to the ball nut, with the ball nut and output shaft being axially shiftable along the screw element.

9. A linear actuator comprising:

a motor including a stator and a rotor rotatable relative to the stator, said rotor including a rotor shaft element, a screw mechanism including a screw element and a follower drivingly engaged with the screw element, with rotation of the screw element causing the follower to shift axially along the screw element, said rotor shaft element and said screw element being drivingly intercoupled, a first bearing rotatably supporting a first element of the rotor shaft element and the screw element, said first element providing support to a second element of the rotor shaft element and the screw element such that the first bearing also rotatably supports the second element and a coupler drivingly attached to the screw element and the rotor shaft element and configured to transmit torque therebetween, said coupler and each of the rotor shaft element and the screw element being drivingly attached by a male/female connection with a bore receiving a complementally shaped spindle.

10. The linear actuator as claimed in claim 9, each of said rotor shaft element and said screw element including the spindle and the coupler presenting the bore.

11. The linear actuator as claimed in claim 9, said bore and said spindle being complementally splined.

12. A linear actuator comprising:

a motor including a stator and a rotor rotatable relative to the stator, said rotor including a rotor shaft element, a screw mechanism including a screw element and a follower drivingly engaged with the screw element, with rotation of the screw element causing the follower to shift axially along the screw element, said rotor shaft element and said screw element being drivingly intercoupled, a first bearing rotatably supporting a first element of the rotor element and the screw element, said first element providing support to a second element of the rotor shaft element and the screw element such that the first bearing also rotatably supports the second element and a coupler drivingly attached to the screw element and the rotor shaft element and configured to transmit torque therebetween, said first element comprising the screw element and said second element comprising the rotor shaft element.

13. The linear actuator as claimed in claim 12, said motor including a motor housing that operably receives at least part of the rotor shaft element, said screw mechanism including a screw mechanism housing that operably receives at least part of the screw element; and an endshield interconnecting the housings.

14. The linear actuator as claimed in claim 13, said coupler being removably attached to the rotor shaft element, said endshield being removably fastened to the motor housing, with the coupler and endshield cooperatively permitting removable attachment of the motor and screw mechanism.

15. The linear actuator as claimed in claim 13, said first bearing being mounted on the endshield, with the endshield rotatably supporting both of the elements.

16. The linear actuator as claimed in claim 13, said motor housing and said endshield cooperatively defining a motor chamber, with the coupler being located in the motor chamber.

17. The linear actuator as claimed in claim 12, said first bearing being received on the screw element and configured to carry an axial force applied to the screw element.

18. The linear actuator as claimed in claim 12, at least part of said coupler being connected between the first bearing and the rotor shaft element.

19. A linear actuator comprising:

a motor including a stator and a rotor rotatable relative to the stator, said rotor including a rotor shaft element, a screw mechanism including a screw element and a follower drivingly engaged with the screw element, with rotation of the screw element causing the follower to shift axially along the screw element, said rotor shaft element and said screw element being drivingly intercoupled;

a first bearing rotatably supporting a first element of the rotor shaft element and the screw element, said first element providing support to a second element of the rotor shaft element and the screw element such that the first bearing also rotatably supports the second element, said motor including a motor housing that operably receives at least part of the rotor shaft element, said screw mechanism including a screw mechanism housing that operably receives at least part of the screw element and an endshield interconnecting the housings, said first bearing being mounted on the endshield, with the endshield rotatably supporting both of the elements.

20. The linear actuator as claimed in claim 19,
said first bearing being received on the screw element and configured to carry an axial force applied to the screw element.

\* \* \* \* \*